United States Patent [19]
Chieffo et al.

[11] 4,392,870
[45] Jul. 12, 1983

[54] VAPOR RECOVERY UNIT PERFORMANCE TEST ANALYZER AND METHOD

[75] Inventors: Anibole B. Chieffo; Howard K. Davis, both of Wilmington, Del.; Joyce A. Rizzo, West Chester, Pa.

[73] Assignee: Sun Oil Company of Pennsylvania, Philadelphia, Pa.

[21] Appl. No.: 262,144

[22] Filed: May 11, 1981

[51] Int. Cl.³ .................................... B01D 53/04
[52] U.S. Cl. ........................................ 55/20; 55/74; 55/163; 55/179; 55/270; 55/274; 55/387
[58] Field of Search .............. 55/18, 20, 21, 58, 74, 55/88, 161, 163, 179, 180, 270, 274, 387

[56] References Cited

U.S. PATENT DOCUMENTS

| | | | |
|---|---|---|---|
| 3,775,946 | 12/1973 | Brazzel | 55/161 X |
| 3,867,111 | 2/1975 | Knowles | 55/21 |
| 3,902,874 | 9/1975 | McAndrew | 55/161 X |
| 3,979,175 | 9/1976 | Kattan et al. | 55/88 X |
| 4,021,211 | 5/1977 | Turek et al. | 55/18 |
| 4,023,940 | 5/1977 | Shultz | 55/163 |
| 4,197,095 | 4/1980 | White, Jr. et al. | 55/20 |
| 4,205,967 | 6/1980 | Sandman et al. | 55/21 |
| 4,247,311 | 1/1981 | Seibert et al. | 55/163 X |
| 4,322,223 | 3/1982 | Christel, Jr. | 55/18 |

Primary Examiner—Robert H. Spitzer
Attorney, Agent, or Firm—J. Edward Hess; Donald R. Johnson; Paul Lipsitz

[57] ABSTRACT

A system for measuring loss of hydrocarbons to the atmosphere during delivery to a tank truck wherein the improvement involves using an integrated electronic system for collection of analytical data.

4 Claims, 1 Drawing Figure

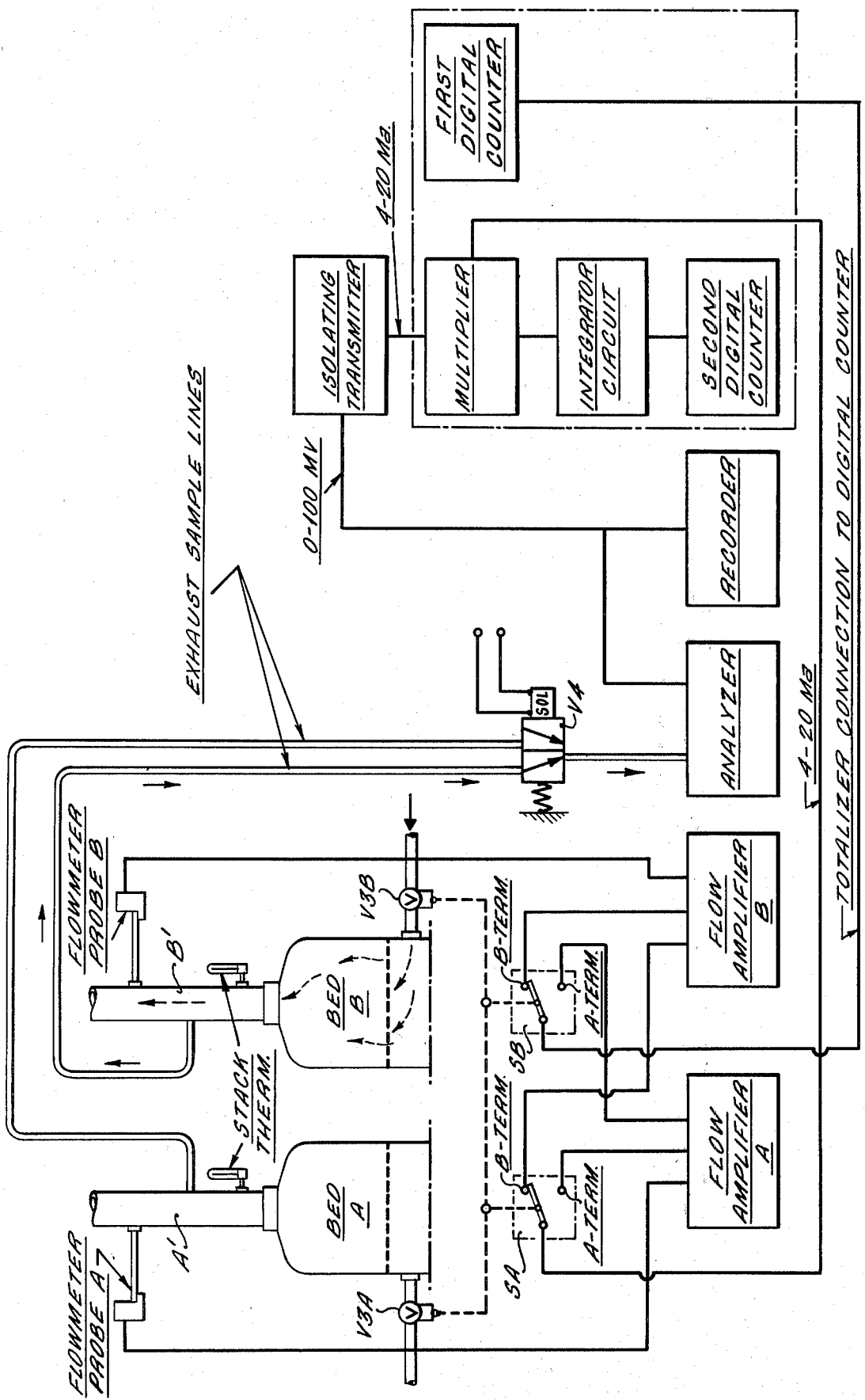

VAPOR RECOVERY UNIT PERFORMANCE TEST ANALYZER AND METHOD

This invention relates to a monitoring system and method for monitoring the effectiveness of systems controlling hydrocarbon emissions during the loading of volatile hydrocarbons, such as gasoline, into trucks or similar vehicles. Such monitoring must be done periodically in order to ascertain if the hydrocarbon recovery units are functioning properly.

It is known to recover hydrocarbon vapors during the filling of tank trucks with gasoline or similar hydrocarbons. One such system, known as the Hydrotech system employs two charcoal bed adsorbers operating in a cycling mode so that when one adsorber unit is adsorbing hydrocarbons, the other unit is being regenerated. As indicated, during the filling procedure while the units are operating, it is periodically necessary to monitor the effectiveness of the system to determine that it is operating properly and that emissions of hydrocarbons are at or below EPA minimum standards.

As the adsorbing unit becomes saturated or close to saturation, it is necessary to switch the roles of the units so that the unit being regenerated becomes the adsorber and vice versa. This switching procedure creates certain problems during the periodic monitoring. For example, there could be overlap responses to the monitoring system so that an incorrect analysis is obtained. What is required during the monitoring period is an immediate cut-off from the adsorbing unit when it is cycled and an immediate response to the cycled unit as it comes on stream. Another difficulty with the presently used system is the complexity of the calculations involved which require tedious and much time consuming operations. The present invention eliminates these problems with the analyzer system.

In accord with the invention, a performance test analyzer is provided for determining loss of hydrocarbons to the atmosphere when a tank truck or similar vehicle is filled with volatile hydrocarbons and wherein vapors of said hydrocarbons present during said filling operation are adsorbed in a first and second parallel charcoal bed operating alternately so that one bed is regenerated under vacuum while the other is adsorbing hydrocarbon vapors, comprising in combination:

(a) temperature sensing means in each of the stacks of said beds, (b) a first flowmeter probe adapted to be inserted in the stack of said first charcoal bed, (c) a second flowmeter probe adapted to be inserted in the stack of said second charcoal bed, (d) a first flow amplifier and a second flow amplifier to enable the signal derived from said corresponding probe in a stack being tested to be fed into a first counter, the output of said counter reflecting the volume of gaseous flow in said stack under test as sensed by said respective probes, (e) switching means associated with first valving means effecting the cycling of said charcoal beds which switching means inactivate said first or second flow amplifier during the cycling of a corresponding first or second bed from regeneration to adsorption, (f) exhaust sample lines from each said stacks leading to second valving means so as to enable gases from the stack being tested to be fed to analyzing means for determining said hydrocarbon concentration as propane, whereby the hydrocarbon concentration, as propane, in each of said stacks at the time of test may be calculated from the parameters of (1) the barometric pressure at the test site, (2) the volume of gas from the stack being measured, (3) the measured stack temperature and (4) the data from the analyzing means, and (g) electronic multiplier and integrator means to obtain the sum of said flow amplifier signal and said analyzer means signal over the testing period, said sum being fed to a second counter to indicate the total flow integrated volume of hydrocarbon (as propane) in the exhaust of said stacks during the test period.

In order to describe the invention in detail, reference is now made to the drawing.

Bed A and Bed B are each charcoal adsorption beds operating alternately, one adsorbing while the other is being regenerated. In the drawing, Bed B is shown as being in the adsorbing cycle while Bed A is being regenerated by placing it under vacuum and stripping off the adsorbed hydrocarbon. This vacuum stripping system is not shown. In each of stacks A and B, as shown, are thermometers or other temperature sensing means. Preferably, an industrial thermometer such as "Weston Model 4503" or a remote sensing thermistor system may be used. Each stack also contains a flowmeter probe as shown and also an exhaust sample line connected through switching means to an analyzer which will be discussed in detail later. In a preferred system in which portability for the monitoring system is desired, each of the temperature sensing means, flowmeter probes and exhaust sample lines are attached to the stacks only when monitoring is being done and the remaining parts of the monitoring system are portable, the electronic and accessory equipment being readily assembled and carried in a small panel truck or van.

As seen from the figure, the vapors exiting from bed B during the filling operation, (which filling operation is not shown) are sensed by the flow meter probe in the stack and an electrical signal representing the flow rate is fed into flow amplifier B. A suitable flow meter probe is the Agar Mass Flow Meter, Model FM 773VE and a suitable flow amplifier is an Agar Flow Amplifier Model FA 722A/3 and this equipment measures the total volume of vapor exhausted to the atmosphere through the stack.

The Mass Flow Meter probe Model FM 773VE is a 1" diameter probe with two sensing thermistors mounted in the tip for direct insertion into pipe lines of 4" diameter and above. It is sensitive to low flows down to about an equivalent velocity of 5 cm/sec in normal air. Of the two sensing thermistors (negative temperature coefficient resistors) one is exposed to the gas flow and the other is shielded from the flow, but maintained in contact with the process gas. The thermistors are maintained at a constant temperature of nominally 110° C. by the flow amplifier input circuitry. By monitoring the power required to maintain the constant temperature, a measure of the gas flow is derived. The reference thermistor (shielded from the flow) is used to automatically compensate for changes in gas properties such as conductivity and temperature. The flow meter probe location in the exhaust stack will vary depending upon the stack diameter, but, as recognized in the art, the probe location should be at least 8 diameters upstream from the bottom of the stack and at least 2 diameters below the upper end of the stack for total accuracy of flow measurement. The probe insertion depth must be equal to 0.2 times the stack diameter ±0.04D which corresponds with a uniform velocity profile. The flow meter amplifier converts the DC signal from the thermistors into an output current of 4–20 ma linear with mass flow. Since a negative flow is possible on some units, the flow meter amplifier is set up with a built in totalizer and voltage to frequency converter which allows the use of two counters. This will enable the system to be set up to monitor and store the integrated forward flow over the test period for an end result of total flow.

The 4–20 ma output signal from the flow amplifier represents standard cubic feet (SCF) of flow and is taken through electrical switching means SA and SB, preferably microswitches, which microswitches are mechanically connected to input valves V3A and V3B which, in turn, control the flow of hydrocarbon emissions to the desired bed. The microswitch causes the appropriate flow amplifier to be turned on for flow measurement and off during regeneration of the corresponding bed. The output signal from the amplifier is taken through switch SB to a first digital counter which reflects the volume of gaseous flow in stack B by direct readout in SCF of flow during the monitoring process as sensed by the flow meter probe. This switch, SB, is used to prevent a negative flow reading (since the unit operates on a cycling vacuum principle) whereby the microwswitch is activated to switch the positive voltage of the digital counter's power supply to coincide with the exhaust stack that is venting. As also seen from the figure, an output from the flow amplifier is taken through microswitch SA to direct the 4 to 20 ma output signals of the appropriate Flow Amplifier into the electronic circuitry of a multiplier and integrator circuit. This switching of microswitches SA and SB is done externally, the microswitches being activated by and also mounted on the inlet motor operated valves V3A and V3B which are controlled by a cam timer, (not shown), conveniently located on the main control panel of the unit which controls the adsorption-regeneration cycle. It will be understood, of course, that in the preferred portable system for carrying out the method of the invention the electrical leads to these switches will have simple connect and disconnect terminals.

Also sampled from the stacks of the adsorbers as shown is the gaseous exhaust which will contain any hydrocarbons not adsorbed and the total exhaust is taken through the appropriate exhaust sample lines through a valve V4, preferably of the solenoid type, to a hydrocarbon analyzer, preferably a non-dispersive infrared (NDIR) analyzer. The two sample lines coming from the exhaust stacks are connected to a three way solenoid valve V4 with a single line leaving the valve and connected to the NDIR analyzer. The solenoid valve V4 is operated electrically so that the sample lines connected to the stacks of the adsorbers are automatically switched so as to sample the exhaust of the adsorber that is processing the vapors and block off the line from the bed being regenerated. The solenoid valve V4 is wired inside of the control panel to operate off of either of the two input valves V3A or V3B which are alternately opened and closed to control to which bed the hydrocarbon emissions are sent. Thus, the electrical signal used to open and close an inlet valve will also control the solenoid valve to pass the exhaust sample from the appropriate bed.

The infrared analyzer provides a continuous on-line analysis of hydrocarbons present in the exhaust sample and is calibrated to provide the data as volume percent propane. A suitable infrared analyzer is a Horiba Mexa 221 nondispersive infrared analyzer having a range of 0–10% by volume of hydrocarbons as propane and the instrument has an output of 0 to 100 mv which output may be transmitted to a strip chart recorder such as a Fisher Model 1000 which would also be calibrated to show a tracing as volume percent propane.

The 0–100 mv signal from the NDIR analyzer is fed into an isolating transmitter such as [an Action Pak Model AP4300] which takes the 0–100 mv signal and converts it into a 4–20 ma signal which is then fed into a multiplier together with the 4 to 20 ma output signal of the flow amplifier. The 0 to 10 v output of the multiplier is fed to an integrator whereby the sum of the flow parameter (SCF of flow) and the hydrocarbon concentration (as propane) over the total time of the test period is obtained and this sum as measured on a counter (preferably a digital counter) connected to the integrator is the total flow integrated volume of propane (hydrocarbon) in the exhaust. A suitable multiplier unit is available as the Action Pak AP 4410 Multiplier Arithmetic Function Module which provides multiplication operations on dc inputs. A suitable integrator is an Ohio Semitronics, Inc. Precision Integrator Model VFC-2 0–100 my input with an ǫnput of 0–10,000 counts per hour. The integrator output is fed to a second counter (preferably digital) which indicates the total flow volume of hydrocarbon as propane (e.g., $C_3$ hydrocarbon) in the exhaust of the stacks over the total time of the first period.

The system described together with the readily obtained parameters of hydrocarbon loading rates to the tank truck, barometric pressure and stack temperature enables calculation of the mass emission rate which is defined as milligrams of hydrocarbons (as propane) emitted per liter of gasoline loaded.

The general procedure for the test method and calculations are as follows:

The test is conducted over the desired period of time under normal operating conditions of the loading terminal. At the beginning and end of each test period, the volume readings are recorded for each product dispenser on each loading rack served by the system under test. Ambient temperature and barometric pressure will be recorded at the beginning and preferably each hour during the test period. The infrared analyzer will be calibrated before, during and after each test period using five previously prepared standards of propane in nitrogen having the expected range of hydrocarbon concentrations.

To begin the test, as exemplified on Hydrotech vapor recovery units, tubing (such a Tygon plastic tubing) is connected to the two exhaust stacks and also to the solenoid valve with a common line attached to the analyzer. This enables an on stream analysis of hydrocarbon concentrations in the exhaust to be obtained. The Hydrotech vapor recovery unit cycles approximately every fifteen minutes regenerating one carbon bed while the other is processing vapors. The solenoid valve is electrically switched so that the exhaust sample being drawn and sampled to the analyzer is from the bed that is adsorbing hydrocarbons. Also, the stack thermometers, flow meter probes and microswitch connections are made as discussed above. The necessary data to be obtained during the test are as follows:

| PARAMETERS OBTAINED | |
|---|---|
| $T_a$ | = Ambient temperture (°C.) |
| $P_b$ | = Barometric pressure (mm Hg) |
| $L_t$ | = Total volume of liquid dispensed from all loading racks during the test period (liters) |
| $V_e$ | = Volume of air-hydrocarbon mixture exhaused from the processing unit (AM$^3$) |
| $V_{es}$ | = Normalized volume of air-hydrogen mixture exhausted at 20° C. and 760 mm Hg = NM$^3$ |
| $C_e$ | = Volume fraction of hydrocarbons in exhausted mixture (volume % as C$_3$H$_8$ ÷ 100) |
| $T_e$ | = Temperature at processing unit exhaust (°C.) |
| $P_e$ | = Pressure at processing unit exhaust (mm Hg abs) |
| $(M/L)_e$ | = Mass of hydrocarbons exhausted from the processing unit per volume of liquid loaded (mg/l) |
| $V_{C3}$ | = Volume of C$_3$H$_8$ (ACF) |
| $M_e$ | = Mass of C$_3$H$_8$ (mg) |
| D | = Stack diameter |
| ACF | = Actual cubic feet |
| AM$^3$ | = Actual cubic meters |
| Counts | = From flow meter counter = 10 ft$^3$/count |
| | = From multiplier circuit and integrator = Ft$^3$C$_3$H$_8$ (propane) |

A typical test procedure calculation is as follows for a system with an outside stack diameter of 8 inches and an inside diameter of 7.981 inches.

Data Conversion
Loading Rack Volume = Total volume from meter readings (gallons) = 59,075
$L_t$ = 59,075 gallons × 3.785 liters/gal. = 223,598.9 liters Temperature
$T_a$ = 69.7° F. = 20.9° C.
$T_e$ = 71.6° F. = 22° C.

Barometer Pressure $$P_b = 29.89 \text{ in. Hg} \times \frac{760 \text{ mm Hg}}{29.92 \text{ in. Hg}} = 759.2 \text{ mm Hg} = P_e$$

Unit Exhaust Volume

Instrument Calibration $$\text{Area of stack} = \frac{\pi D^2}{4 \times 144} = \frac{3.14 \times (7.981)^2}{4 \times 144} = 0.347 \text{ Ft}^2$$

Counts (1st Digital Counter) = 1309 Counts/Ft$^2$ $$ACF \text{ of Flow} = 1309 \text{ counts/Ft}^2 \times \frac{10 \, ACF}{\text{Count}} \times$$

.347 (area of stack, Ft$^2$) = 4542.2 ACF $$V_e = 4542.2 \, ACF \times \frac{28.32 \text{ liters}}{FT^3} \times \frac{M^3}{1000 \text{ liters}} = 128.64 \, AM^3$$

$$V_{es} = 128.64 \, AM^3 \times \frac{293° \text{ K.}}{22 \, T_e + 273} \times \frac{759.2 \text{ mm Hg}}{760 \text{ mm Hg}} =$$

127.63 $NM^3$

+ Calibration factor from manufacturer for flow meter probe.

Volume Fraction of Propane in Exhaust Shown by Instrument
76 Counts = 7.6 ACF C$_3$ = $V_{C3}$ $$C_e = \frac{V_{C3}}{V_e} = \frac{7.6 \, ACF \, C_3}{4,542.2 \, ACF} = 0.00167 \text{ Volume fraction } C_3$$

Calculation of Mass Emission $$M_e = \frac{\text{gm}}{\text{gm-mole}} \times \frac{\text{gm-mole}}{22.4 \text{ l.}} \times \frac{273° \text{ K.}}{293° \text{ K.}} \times$$

$$\frac{1000 \text{ mg}}{\text{gm}} \frac{1000 \text{ l.}}{M} \times V_{es} \times C_e$$

$$M_e = 1.833 \times \frac{10^6 \text{ mg } C_3}{NM^3 C_3} \times 127.63 \, .00167$$

$M_e$ = 3061.11 mg C$_3$ = mass of propane emitted during loading of liquid

Average Processing Unit Emission $$\left(\frac{M}{L}\right)_e = \frac{M_e}{L_t} =$$

$$\frac{3061.11}{223598.9} = .013 \text{ mg/l} = \text{mass of hydrocarbon exhausted from absorber unit per liter of liquid loaded}$$

Thus, the emission of hydrocarbons to the atmosphere is quickly and accurately obtained by the above calculation.

We claim:

1. A performance test analyzer for determining loss of hydrocarbons to the atmosphere when a tank truck or similar vehicle is filled with volatile hydrocarbons and wherein vapors of said hydrocarbons present during said filling operation are adsorbed in a first and second parallel charcoal bed operating alternately so that one bed is regenerated under vacuum while the other is adsorbing hydrocarbon vapors, comprising in combination:

(a) temperature sensing means in each of the stacks of said beds, (b) a first flowmeter probe adapted to be inserted in the stack of said first charcoal bed, (c) a second flowmeter probe adapted to be inserted in the stack of said second charcoal bed, (d) a first flow amplifier and a second flow amplifier to enable the signal derived from said corresponding probe in a stack being tested to be fed into a first counter, the output of said counter reflecting the volume of gaseous flow in said stack under test as sensed by said respective first and second flowmeter probes, (e) switching means in combination with first valving means effecting the cycling of said charcoal beds which switching means inactivate said first or second flow amplifier during the cycling of a corresponding first or second bed from regeneration to adsorption, (f) exhaust sample lines from each of said stacks leading to second valving means so as to enable gases from the stack being tested to be fed to hydrocarbon analyzing means for determining said hydrocarbons as propane concentration, whereby said hydrocarbon concentration, as propane, in each of said stacks at the time of test may be calculated from the parameters of (1) the barometric pressure at the test site, (2) the volume of gas from the stack being measured, (3) the measured stack temperature, and (4) the data from the analyzing means, and (g) electronic multiplier and integrator means to obtain the sum of said flow amplifier signal and said hydrocarbon analyzer means signal over the testing period, said sum being fed to a second counter to indicate the total flow integrated volume of hydrocarbon (as propane) in the exhaust of said stacks during the test period.

2. The analyzer of claim 1 wherein the first and second counters are digital counters.

3. The analyzer of claim 1 wherein said flow amplifiers, said hydrocarbon analyzer means, said electronic multiplier and integrator means and said counters are truck mounted.

4. A method for determining loss of hydrocarbons to the atmosphere when a tank truck or similar vehicle is filled with volatile hydrocarbons and wherein vapors of said hydrocarbons present during said filling operation are adsorbed in a first and second parallel charcoal bed operating alternately so that one bed is regenerated under vacuum while the other is adsorbing hydrocarbon vapors, which comprises in combination:

(a) determining the temperature in each of the stacks of said beds, (b) inserting a first flowmeter probe in the stack of said first charcoal bed, (c) inserting a second flowmeter probe in the stack of said second charcoal bed, (d) passing the signal from said probe in the stack being tested into a flow amplifier and obtaining on a first counter the output from the signal derived from said probe, the output of said first counter reflecting the volume of gaseous flow in said stack under test as sensed by said respective probes, (e) feeding the exhaust gases from the stack being tested to hydrocarbon analyzing means for determining said hydrocarbons as propane concentration, whereby said hydrocarbon concentration, as propane, in each of said stacks at the time of test may be calculated from the parameters of (1) the barometric pressure at the test site, (2) the volume of gas from the stack being measured, (3) the measured stack temperature, and (4) the data from the analyzing means, and (f) feeding a signal from said flow amplifier to electronic multiplier and integrator means to obtain the sum of said flow amplifier signal and said hydrocarbon analyzer means signal over the testing period, said sum being fed to a second counter to indicate the total flow integrated volume of hydrocarbon (as propane) in the exhaust of said stacks during the test period.

* * * * *